(12) United States Patent
Amthor et al.

(10) Patent No.: US 12,525,041 B2
(45) Date of Patent: Jan. 13, 2026

(54) ASSESSMENT METHOD FOR SIMULATION MODELS IN MICROSCOPY

(71) Applicant: CARL ZEISS MICROSCOPY GMBH, Jena (DE)

(72) Inventors: Manuel Amthor, Jena (DE); Daniel Haase, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 293 days.

(21) Appl. No.: 18/559,685

(22) PCT Filed: May 9, 2022

(86) PCT No.: PCT/EP2022/062514
§ 371 (c)(1),
(2) Date: Nov. 8, 2023

(87) PCT Pub. No.: WO2022/238343
PCT Pub. Date: Nov. 17, 2022

(65) Prior Publication Data
US 2024/0282127 A1 Aug. 22, 2024

(30) Foreign Application Priority Data
May 11, 2021 (DE) ...................... 10 2021 204 805.6

(51) Int. Cl.
*G06V 10/764* (2022.01)
*G06T 7/00* (2017.01)
*G06V 20/69* (2022.01)

(52) U.S. Cl.
CPC .......... *G06V 20/698* (2022.01); *G06T 7/0012* (2013.01); *G06V 10/764* (2022.01);
(Continued)

(58) Field of Classification Search
None
See application file for complete search history.

(56) References Cited

U.S. PATENT DOCUMENTS 11,508,481 B2 * 11/2022 Naik ...................... G16H 50/20
2018/0336395 A1 * 11/2018 Madabhushi ........ G06V 10/764
(Continued)

FOREIGN PATENT DOCUMENTS

DE 102019114012 A1 11/2020
DE 102020126554 A1 4/2022
(Continued)

OTHER PUBLICATIONS

English Translation of International Search Report from PCT Application No. PCT/EP2022/062514, Sep. 19, 2022, 3 pages.
(Continued)

*Primary Examiner* — Tsung Yin Tsai
(74) *Attorney, Agent, or Firm* — Brake Hughes Bellermann LLP

(57) ABSTRACT

A number of techniques for assessing simulation models for use in microscopy are provided. In one example technique, a first image ($I_A$) of a sample is recorded with a first image recording type, and storing image values of the first image ($I_A$) are stored. Based on a simulation model ($SM_{A \to C}$) being applied to the first image ($I_A$), a simulated image ($I_{A \to C}$) of a third image recording type of the sample is simulated. A third image ($I_C$) of the sample is recorded with a third image recording type. The third image ($I_C$) is compared with the simulated image $I(_{A \to C})$ of the third image recording type for verification of compliance with previously defined quality criteria, and the simulation model ($SM_{A \to C}$) is classified as permissible when the quality criteria are complied with.

12 Claims, 5 Drawing Sheets

(52) U.S. Cl.
CPC ............... *G06T 2207/10056* (2013.01); *G06T 2207/30024* (2013.01); *G06T 2207/30168* (2013.01)

(56) References Cited

U.S. PATENT DOCUMENTS

| | | | |
|---|---|---|---|
| 2019/0347557 A1* | 11/2019 | Khan | G06N 3/048 |
| 2019/0384047 A1* | 12/2019 | Johnson | G06T 7/11 |
| 2020/0250398 A1* | 8/2020 | Courtiol | G06V 10/82 |
| 2020/0327657 A1* | 10/2020 | Klaiman | G06T 7/0012 |
| 2020/0371333 A1 | 11/2020 | Amthor et al. | |
| 2020/0394825 A1* | 12/2020 | Stumpe | G16H 30/40 |
| 2021/0043331 A1 | 2/2021 | Ozcan et al. | |
| 2021/0280311 A1* | 9/2021 | Naik | G06N 5/04 |
| 2022/0114725 A1 | 4/2022 | Amthor et al. | |

FOREIGN PATENT DOCUMENTS

| | | |
|---|---|---|
| WO | 2019032723 A1 | 2/2019 |
| WO | 2019229573 A1 | 12/2019 |
| WO | 2020018154 A1 | 1/2020 |
| WO | 2021228894 A1 | 11/2021 |

OTHER PUBLICATIONS

Chen, et al., "An Overview of Image-To-Image Translation Using Generative Adversarial Networks", ICPR 2020 Workshops, LNCS 12666, 2021, pp. 366-380.

Mercan, et al., "Virtual Staining for Mitosis Detection in Breast Histopathology", 2020 IEEE 17th International Symposium on Biomedical Imaging (ISBI), Apr. 3-7, 2020, pp. 1770-1774.

Nguyen, et al., "Virtual Organelle Self-Coding for Fluorescence Imaging Via Adversarial Learning", Journal of Biomedical Optics, vol. 25(9), Sep. 2020, pp. 096009-1-096009-18.

Sargent, "Verification and Validation of Simulation Models", Proceedings of the 2011 Winter Simulation Conference, 2011, 17 pages.

Zhu, et al., "Unpaired Image-to-Image Translation Using Cycle-Consistent Adversarial Networks", ICCV; arXiv:1703.10593v1, Mar. 30, 2017, 18 pages.

* cited by examiner

ASSESSMENT METHOD FOR SIMULATION MODELS IN MICROSCOPY

CROSS REFERENCE TO RELATED APPLICATIONS

This application is a 35 U.S.C. § 371 National Phase Entry Application from PCT/EP2022/062514, filed May 9, 2022, designating the U.S., and claims the benefit of German Application No. 10 2021 204 805.6, filed May 11, 2021, the disclosure of each of which is incorporated herein by reference in its entirety.

FIELD OF THE INVENTION

The invention relates to an assessment method for simulation models in microscopy. So-called image-to-image models are increasingly being used in the field of microscopy in order to improve captured images or in order to simulate complex contrast types. The simulation may take place with the aim of sparing sensitive samples or in order that a contrast type that is not available per se can nevertheless be made available.

BACKGROUND OF THE INVENTION

The simulation models used for this may be, in particular, models on the basis of machine learning (ML models). Such simulation models are trained using data of a training data set, in which case the data sets available for this purpose are often severely limited and comprise, for example, only a specific type of samples and recording parameters. If a simulation model trained in this way is applied to hitherto unseen, i.e., to date unknown, image data, an inadequate quality of the prediction may arise. In this regard, artefacts may occur, for example, if the input data used for the relevant model differ significantly from the training data.

If simulation models are used, it is therefore desirable to verify their potential suitability in an application, in particular to a data set with unknown input data (e.g., out-of-distribution data). It is possible, for example, to assess the input or output data of a simulation model, as described in DE 10 2019 114 012 A1 and in the unpublished application DE 10 2020 126 554. This involves checking whether the actual input or output data of the model correspond sufficiently to expected input or output distributions, respectively.

What is disadvantageous about such a procedure is that image-to-image applications, for example, in so-called "virtual staining", constitute very complex applications. In this case, a verification of the input data does not permit a reliable statement concerning the occurrence of artefacts. In a verification of the output data, it is difficult to judge whether unusual output data are actually artefacts or whether just an event that is rare, but actually present, is imaged.

SUMMARY OF THE INVENTION

The invention is based on the object of proposing possibilities for assessing simulation models by means of which disadvantages of the prior art are reduced.

In this case, the object is achieved by means of an assessment method as claimed in the independent claim. The dependent claims relate to advantageous developments.

In order to be able to clearly explain the invention below, three alternative configurations of the method according to the invention are presented, the respective special features and overlaps of which are demonstrated. The images and the simulation models are assigned indices here in order to allow a compact description. The terms prediction or simulation are understood in association with the invention synonymously in the sense of a mapping or a virtual projection using a mathematical function, a simulation model and/or a machine learning simulation model.

In the assessment method according to the invention for simulation models in microscopy, in a first alternative, a first image IA of a sample is recorded with a first image recording type. The image values captured in the process are stored. Proceeding from the first image IA, a simulated image IA→B of a second image recording type is predicted by means of a simulation model SMA→B.

The simulated image IA→B of the second image recording type serves in turn as a data basis (input data) of a simulation model SM(A→B)→C, by means of which a simulated image I(A→B)→C of a third image recording type is predicted.

In order to provide a comparison basis for a subsequent image comparison, a third image IC of the third image recording type is recorded and stored. This third image IC of the third image recording type (also abbreviated hereinafter to: third image IC), which can optionally also be kept in a database in a retrievable manner, is compared with the simulated image I(A→B)→C of the third image recording type for verification of compliance with previously defined quality criteria (see below). If it is ascertained in the course of the comparison that the quality criteria are complied with, the simulation model SMA→B is classified as permissible.

In the first alternative of the method according to the invention, the results of the prediction of the simulated third image I(A→B)→C are compared with the actually captured third image IC. A direct assessment of the simulation model SM(A→B)→C can be performed in this way. The assessment of the simulation model SMA→B for predicting the simulated second image IA→B takes place implicitly since a third image I(A→B)→C predicted correctly on the basis of the simulated second image IA→B presupposes that the prediction of the simulated second image IA→B also took place correctly.

In a second alternative of the method according to the invention, likewise, a first image IA of a sample is recorded with a first image recording type and the image values are stored. Proceeding from the first image IA of the first image recording type (also abbreviated hereinafter to: first image IA), a simulated image IA→C of a third image recording type is predicted by means of a simulation model SMA→C. A third image IC is recorded with the third image recording type and stored. A third image IC that has already been previously recorded and stored in a database in a retrievable manner, for example, is equivalent again.

The third image IC is compared with the simulated image IA→C of the third image recording type for verification of compliance with previously defined quality criteria. If the quality criteria are complied with, the simulation model SMA→C for predicting the simulated image IA→C of the third image recording type is classified as permissible. The conclusion that can also be drawn here is that the sample used does not have any special features which cannot be predicted by the available simulation model SMA→C. It can therefore be assumed that an application of a simulation model SMA→B is likewise possible without problems and a qualitatively sufficient prediction will take place.

The third alternative again includes the method step of recording a first image ($I_A$) of a sample with a first image recording type and storing the image values.

Two procedures are possible in the third alternative. In the first procedure, proceeding from the first image IA, a simulated image IA→B of the second image recording type is predicted by means of a simulation model SMA→B. Proceeding from this simulated image IA→B of the second image recording type, subsequently, a simulated image I(A→B)→A of the first image recording type is predicted by means of a simulation model SM(A→B)→A and is stored.

At the beginning of the second procedure, proceeding from the first image IA, a simulated image IA→C of the third image recording type is predicted by means of a simulation model SMA→C. This simulated image IA→C of the third image recording type is now a basis for predicting a simulated image I(A→C)→A of the first image recording type by means of a simulation model SM(A→C)→A. The simulated image I(A→C)→A is stored.

In order to carry out an assessment of the simulation model SM(A→B)→A, the first image ($I_A$) is compared with the simulated image I(A→B)→A generated according to the first procedure or with the simulated image I(A→C)→A of the first image recording type generated according to the second procedure for verification of compliance with previously defined quality criteria. If it is ascertained that the quality criteria are complied with, it can be deduced from this that the simulation model SMA→B already applied in the first procedure can likewise be classified as permissible. Otherwise the quality criteria would not have been complied with in the comparison of simulated image I(A→B)→A and first image IA.

If the second procedure was chosen, then in the event of compliance with the quality criteria being ascertained, a prediction of a simulated image IA→B by means of the simulation model SMA→B is regarded as permissible. This assessment is based on the assumption that the sample does not have any properties which are not captured by means of a simulation model SMA→B and correspondingly taken into account in the prediction.

In those procedures of the third alternative, it is presupposed that a prediction to another image and back again should lead to considerable errors if the corresponding input and/or output data had not been implemented sufficiently correctly by the respective simulation models (see above).

The third alternative thus concerns a configuration of the method according to which, by means of the simulation models, a prediction is made in a loop, as also takes place for example, in a so-called CycleGAN (Cyclic Generative Adversarial Network).

The third alternative also encompasses special cases of the first alternative, for example. If in the first alternative, for example, a simulated image of the first image recording type is predicted directly instead of the simulated third image of the third image recording type, i.e., if contrast A is chosen to be identical to contrast C, this corresponds to the first procedure of the third alternative.

The method according to the invention makes it possible, in all of its alternative configurations, that a simulated image IA→B of a second image recording type can be provided with a high prediction quality and very high trustworthiness, without the need for actually capturing a second image IB of the second image recording type as a reference or control image. This advantage is afforded particularly if a sample cannot be represented with the second image recording type for biological, technical and/or organizational reasons. This may be the case, for example, if the sample is not correspondingly stained or because a microscope used does not support the second image recording type.

By way of example, it is possible that a microscope does not allow DAPI contrast, which is very well suited to the representation of cell nuclei (DAPI is the abbreviation of a marker for AT-rich regions in DNA). Such a contrast is advantageous, however, for navigation within a sample since users are already familiar with this contrast from the use of other microscopes. By means of a simulation model which has been trained on typical samples using machine learning methods, for example, a contrast available at the microscope (image recording type; e.g., bright field-wide field) can be imaged on DAPI.

The method according to the invention can be carried out with a multiplicity of image recording types. In this regard, the first, second and third image recording types can be for example, different contrast methods and/or different channels of a contrast method. Different channels can be fluorescence channels of different wavelengths, for example, by means of which different structures can be imaged. In this regard, for example, an image of a DAPI fluorescence channel can be generated as a simulated second image proceeding from a first image of a fluorescence channel showing fluorescence-marked microtubules.

Besides different contrast types, identical contrast types can also serve as different image recording types if these differ sufficiently with regard to their actual manifestation. By way of example, two image recording types can be realized if, although the same contrast type is used, different illumination powers of a contrast method are applied. For example, a very low laser power can be used for the first image recording type, while a higher laser power is used for the third image recording type. A second and/or third image recording type can also result from a reconstructed and denoised second and/or respectively third simulated image of the same contrast type being generated and provided.

The image recording types on the basis of which the simulation takes place or which are a result of a simulation can be for example, the contrast methods of bright field, dark field, DIC (differential interference contrast) and fluorescence methods. In the latter, structures of the sample are specifically provided with fluorescent markers and the fluorescent light thereof is detected.

In advantageous configurations of the method according to the invention, the prediction of the simulated images is carried out by means of a machine learning simulation model. For example, applicability of the method to different samples in conjunction with expected consistently good predictions is achieved as a result.

As already mentioned further above, the image data—used in a respective configuration of the method—of the images IA and IC in the first and/or third image recording type and/or image data of the simulated images need not actually be generated anew every time, but rather can be kept as stored data and on request can be retrieved and processed.

The method according to the invention can advantageously be carried out on regions of the sample which are situated away from those regions which are intended to be captured during a subsequent experiment. An actual application of the simulation models classified as permissible thus takes place at a different location of the sample than that at which the assessment of the simulation model was previously carried out. An undesired adverse effect on the sample, for example, bleaching of fluorophores present in the sample, can be avoided in this way.

The image data used in the method according to the invention preferably represent the same region of the sample. In this case, the captured image values are spatially assigned with respect to one another, i.e., registered with respect to one another.

In order to check the permissibility of the simulation models, previously defined quality criteria are applied during the comparisons of simulated images with images serving as a reference. Such quality criteria may be, for example, previously defined metrics and/or structure-based comparison values which are determined e.g., by means of a correlation, an IoU (intersection over union) and/or a comparison of (data) distributions.

Furthermore, the comparisons can be carried out using ML models. In this regard, it is possible to train a corresponding model which assesses differences between the compared image data and/or recognizes and evaluates specific indications of suitability or non-suitability. It is also possible to train ML models on the recognition of differences (detection of anomalies; novelty detection) and to use them for a comparison.

A major advantage of the method according to the invention can be seen in the fact that a comparison of the simulated image data with actually measured target data takes place. By virtue of this comparison, the assessment of the respective model quality is more accurate and more reliable than in methods in the prior art and is also independent of the assessment of a target distribution. In contrast to the method according to the invention, input data or output data of the model are assessed in methods according to the prior art. This involves assessing whether these data match the input or output data distribution, respectively.

In further configurations of the method, alternatively or additionally, items of situation-dependent, sample-dependent and/or user-dependent context information can be used as input variables for the verification of the quality criteria. Such context information can be, for example, parameters of the microscope used, such as, for example, the modification used and/or the numerical aperture. Further information can be, for example, the illumination wavelengths and illumination intensities used, the optional use of an immersion medium, the type of staining of the sample, the sample type per se and/or the manner of preparation of the sample. User-related information can reside in the person of the respective user and can be information about sample types and/or preparation procedures frequently used by the user and, for example, known individual variations in the handling of the sample.

In order to afford a user of the method according to the invention an opportunity to interact with the method sequence, a currently attained training state of the simulation model used for predicting the respective simulated image subjected to the verification for compliance with the quality criteria can be determined depending on a result of the verification. This training state determined is advantageously presented on a display. This is preferably associated with a query for the input or selection of at least one control command by means of which for example, further iterations of the training sequence of the relevant simulation model can be triggered if the current training state is judged not to be sufficient. In further configurations, the current training state determined can be displayed to the user and, in the case of an insufficient training state, training data of the current sample can automatically be captured again and the simulation model can be retrained.

The information made available to the user can additionally give indications about expected artefacts in the respective simulated images, particularly if the training state of the simulation model is classified as unsuitable or suitable only to a limited degree.

Such an interaction with a user allows the latter to train models himself/herself. Moreover, on account of the interaction presented, even users who do not have qualified expertise in the field of machine learning can deal with corresponding systems and are protected against erroneous results on account of inadequately trained simulation models.

All alternatives of the method make available a simulated image IA→B of the second image recording type or open up the provision thereof. A simulated image IA→B of the second image recording type can be used in various ways here. One advantageous possibility for use consists in using such a simulated image IA→B in a method for image evaluation.

In such an image evaluation method, a second image IB is recorded with the second image recording type and stored. The simulated image IA→B of the second image recording type and the second image IB recorded with the second image recording type are compared with one another in order to find differences between them. Differences found in the process are captured, analyzed and evaluated.

Such differences between the simulated second image IA→B and the second image IB can be recognized better or can even actually be recognized in the first place if existing commonalities and differences between at least 2 image recording types are utilized and taken into account. Differences may be based for example, on the noise that usually occurs in image and signal processing. Artefacts of sample treatment, for example, of sample preparation, sample staining or sample marking, likewise constitute differences and are also referred to as anomalies. Anomalies are for example, erroneously stained cells or cell structures. Differences (anomalies) may also stem from the fact that cells or cell constituents have or have not accepted staining in an undesired or unexpected manner. Furthermore, a dye used may exhibit unexpected behavior, such as may result from the bleaching behavior of a fluorescent dye, for example.

Differences may also be caused by structurally conspicuous sample regions, e.g., deformed cell regions. If the presence or absence of a known structure is regarded as a difference, then this can be recognized and captured by means of such an image evaluation method. As a result, such a method advantageously differs from known methods such as, for example, autoencoders or one-class classification.

Differences may be of particular interest to the user. A region of the sample in which differences occur can therefore also be recognized and identified as a so-called ROI (region of interest). Anomalies and ROI are referred to as differences here for simplification.

If differences are found in the course of the comparison, then these differences can be allocated to previously defined categories. Such categories are for example, simulation errors; structures simulated but not captured in the second image; and/or the presence/absence of at least one predefined structure in the second image. At least one category can also include those differences which for example, are classified as noise artefacts and are intended no longer to be taken into account in the further analyses.

BRIEF DESCRIPTION OF THE DRAWINGS

The invention will be explained below on the basis of exemplary embodiments and with reference to drawings, in which.

DETAILED DESCRIPTION

Alternatives of the method according to the invention for assessing the quality and suitability of simulation models used are illustrated in FIGS. 1 to 4. These alternatives can be incorporated in a method as explained with reference to FIG. 5.

Figure 1:
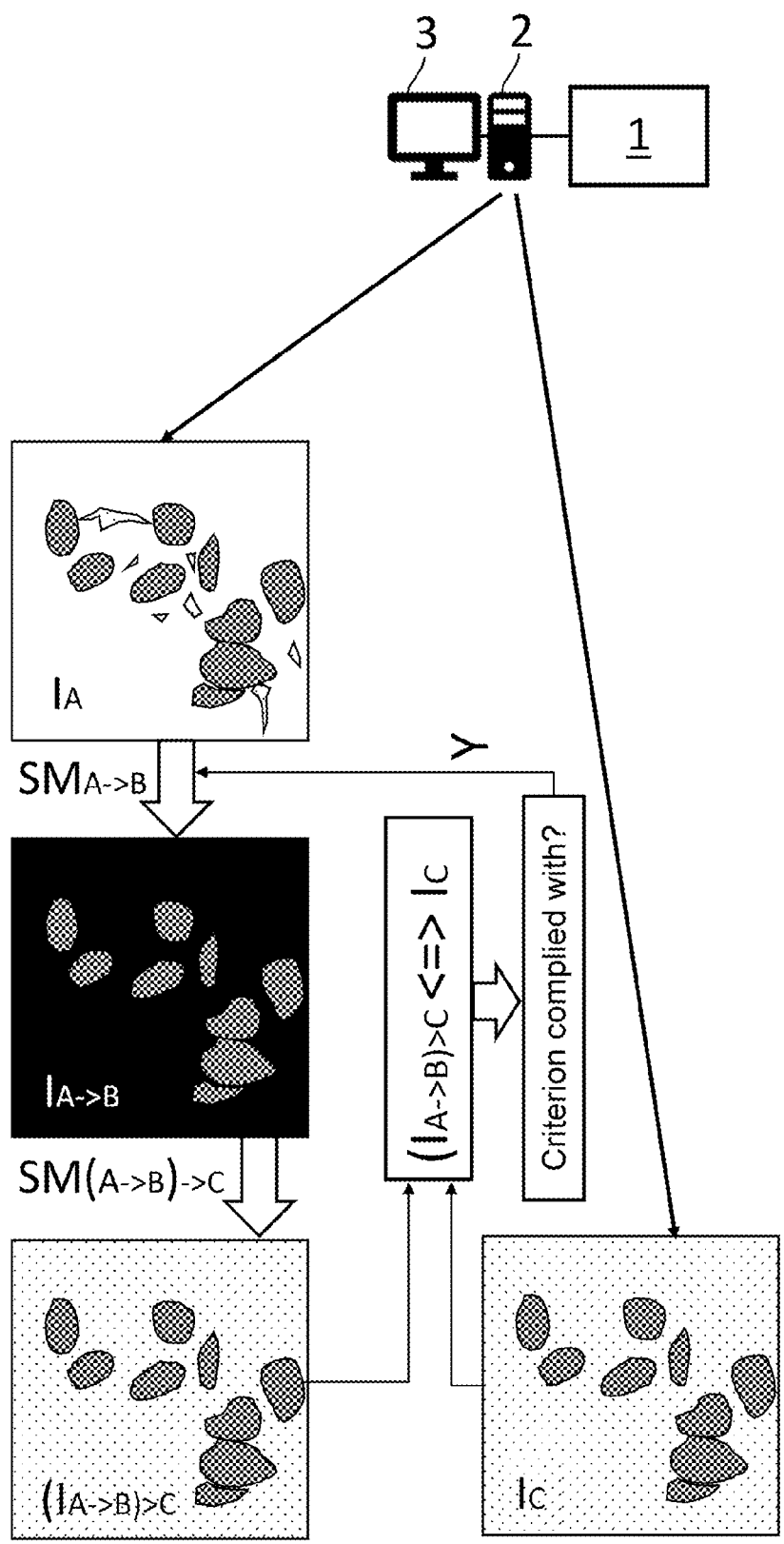
FIG. 1 shows a microscope and a schematic sequence of a configuration in accordance with a first alternative of the method according to the invention.

By means of a microscope 1 which allows image recordings in at least two contrast types or additionally or alternatively in at least two channels of one contrast type, a first image IA of a first image recording type is captured, for example, in the bright field mode (FIG. 1). The microscope 1 is connected to an evaluation unit 2 in the form of a computer and to a monitor as display 3. The evaluation unit 2 additionally has a data memory (not shown explicitly) and is configured in such a way that it simulates or can simulate an image IA→B proceeding from the first image IA by applying a simulation model SMA→B in such a way as though the simulated image IA→B had been recorded with a second image recording type, for example, with a second contrast type, such as e.g., as a fluorescence image.

A first alternative of the method according to the invention is illustrated schematically in FIG. 1. Proceeding from the first image IA of the first image recording type, a simulated image IA→B of the second image recording type is predicted by means of a simulation model SMA→B. On the basis thereof a simulated image (IA→B)→C of a third image recording type is predicted by means of a simulation model SM(A→B)→C. In addition, an image IC of the third image recording type is actually captured from the predicted region of the sample and compared with the simulated image (IA→B)→C with regard to compliance with previously defined quality criteria. If the quality criteria are complied with (symbol: Y), the conclusion derived from this is that both the simulation model SMA→B and the simulation model SM(A→B)→C are sufficiently well suited. If considerable errors have occurred during at least one of the simulations, it is assumed that these errors will be manifested in a correspondingly negative result of the comparison of simulated image (IA→B)→C and image IC. If the comparison has a positive result, the already simulated image IA→B of the second image recording type can be made available for a further use and/or evaluation (see FIG. 5, for example).

If, during the comparison carried out, it is ascertained that the quality criteria are not satisfied, both simulation models SMA→B and SM(A→B)→C can be retrained with new data, in particular from the sample. If the ascertained result of the comparison permits the concrete decision as to which of the simulation models SMA→B and SM(A→B)→C has not yet been adequately trained, retraining can be restricted to this simulation model. Optionally, information concerning the current training state of at least one the simulation models SMA→B and SM(A→B)→C can be displayed to a user on the display 3. A decision regarding retraining can be taken actively by the user by a corresponding input being effected and a corresponding control command thereupon being generated. The statements made above apply, mutatis mutandis, to all the exemplary embodiment (FIGS. 1 to 5) and all the simulation models.

Figure 2:
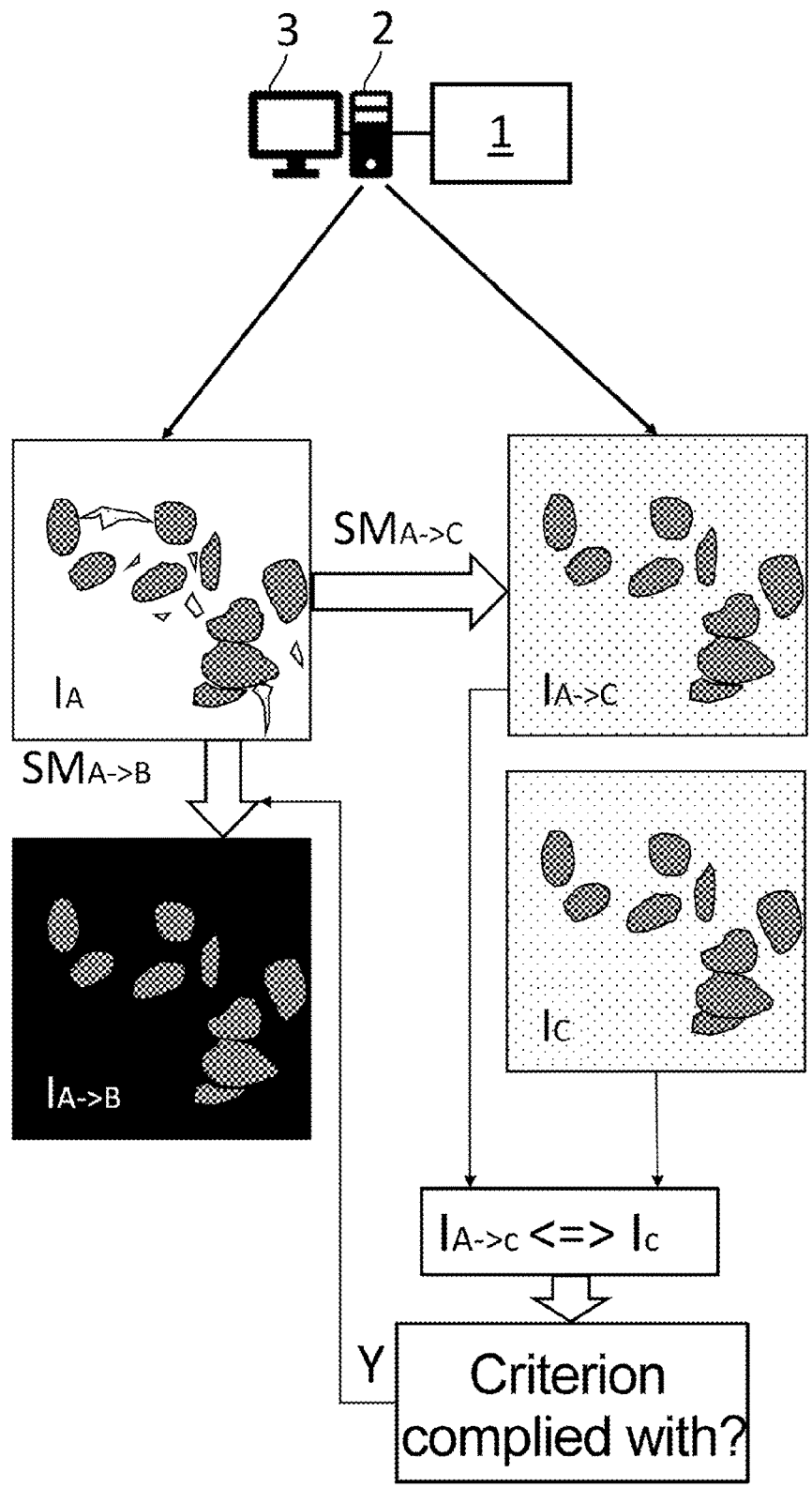
FIG. 2 shows a microscope and a schematic sequence of a configuration in accordance with a second alternative of the method according to the invention.

A second alternative of the method according to the invention is illustrated in FIG. 2. Proceeding from a first image IA of the first image recording type, a simulated image IA→C of a third image recording type is predicted by means of a simulation model SMA→C. In addition, an image IC of the third image recording type is actually captured from the predicted region of the sample and compared with the simulated image IA→C with regard to compliance with previously defined quality criteria. If the quality criteria are complied with (symbol Y), the simulation model SMA→C is assessed as applicable. This result permits the conclusion that the sample or the image data thereof do not contain any unusual values or do not concern any regions of the sample that are problematic for a prediction. The positive assessment of the simulation model SMA→C allows the assumption that a prediction of a simulated image IA→B of the second image recording type will likewise take place sufficiently precisely. Proceeding from the first image IA, the simulated image IA→B is then predicted by means of a simulation model SMA→B. Said simulated image can be provided and delivered to a further use and/or evaluation.

Figure 3:
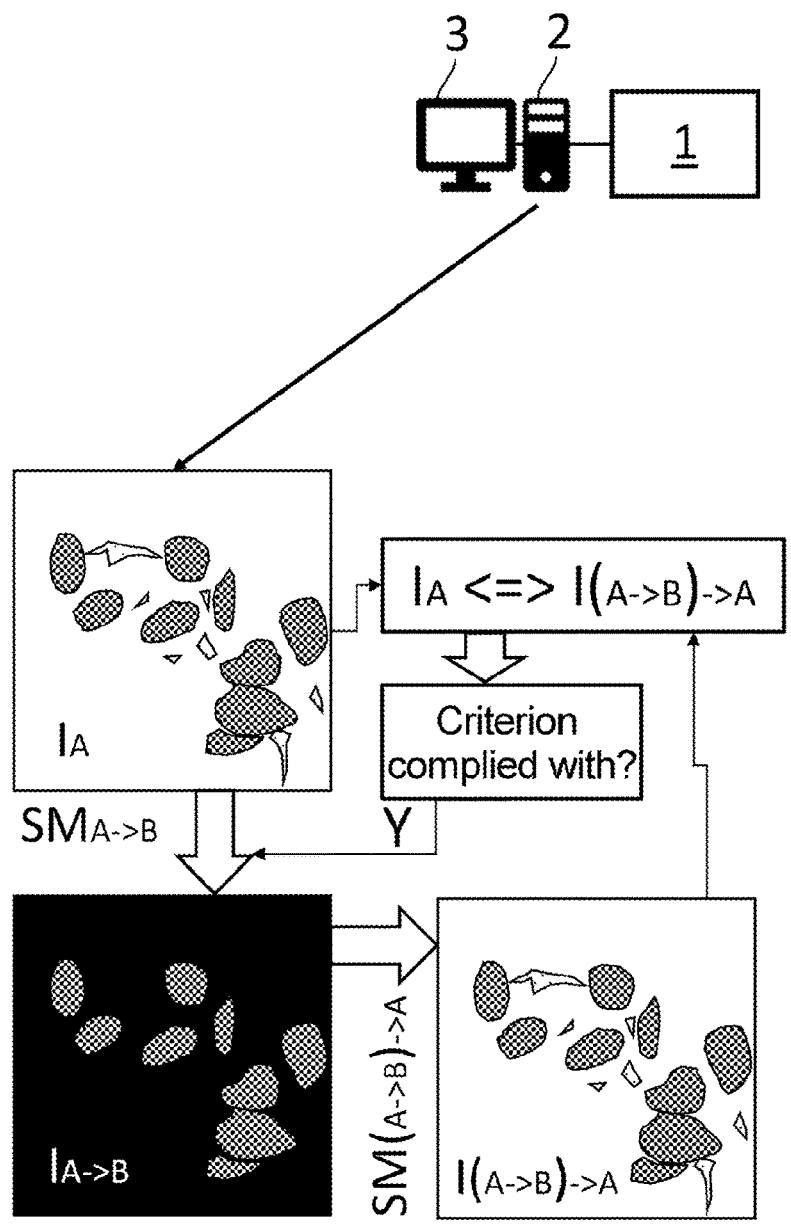
FIG. 3 shows a microscope and a schematic sequence of a configuration in accordance with a first procedure of a third alternative of the method according to the invention.

FIG. 3 schematically illustrates a first procedure of the third alternative of the method according to the invention. Proceeding from a first image IA of the first image recording type, a simulated image IA→B of a second image recording type is predicted by means of a simulation model SMA→B. The image data of this simulated image IA→B of the second image recording type in turn represent the input data of a simulation model SM(A→B)→A, by means of which a simulated first image I(A→B)→A of the first image recording type is predicted.

The original first image IA and the simulated first image I(A→B)→A are compared with one another with regard to compliance with predetermined quality criteria in the course of a verification. If the result shows that the quality criteria are satisfied (symbol Y), the conclusion drawn is that both simulation models SMA→B and SM(A→B)→A are trained sufficiently well.

The already simulated image IA→B of the second image recording type can be stored and made available to further uses.

Figure 4:
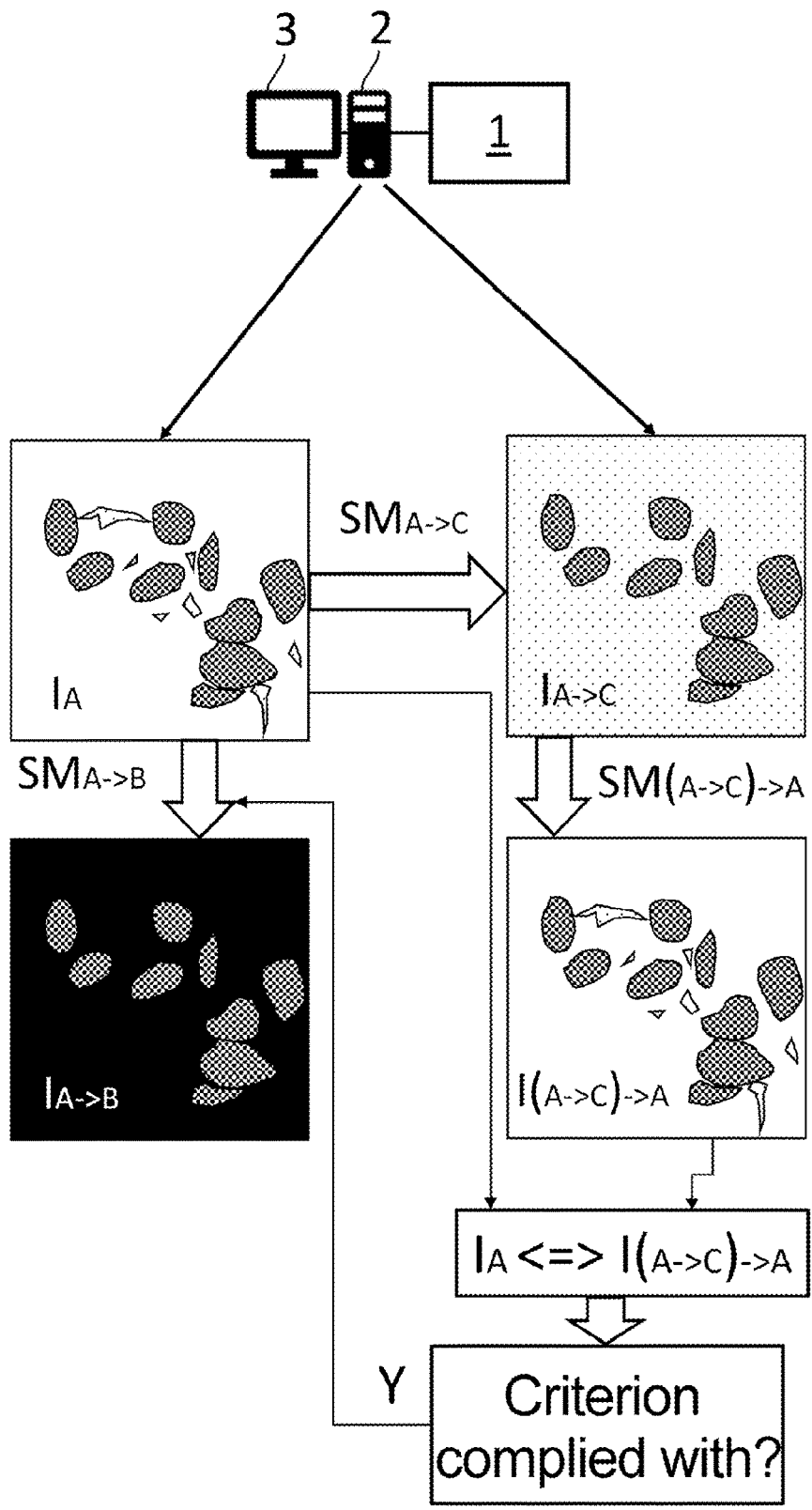
FIG. 4 shows a microscope and a schematic sequence of a configuration in accordance with a second procedure of a third alternative of the method according to the invention.

A second procedure of the third alternative of the method according to the invention begins once again with providing the first image IA of the first image recording type (FIG. 4). Proceeding from the first image IA, a simulated image IA→C of a third image recording type is predicted by means of a simulation model SMA→C.

The image data of this simulated image IA→C of the third image recording type in turn represent the input data of a simulation model SM(A→C)→A, by means of which a simulated first image I(A→C)→A of the first image recording type is predicted.

The original first image IA and the simulated first image I(A→C)→A are compared with one another with regard to compliance with predetermined quality criteria in the course of a verification. If the result shows that the quality criteria are satisfied (symbol Y), the conclusion drawn is that the sample does not have any special features and the application of the simulation model SMA→B gives reason to expect a simulated image IA→B of the second image recording type which likewise satisfies the quality criteria. The simulated image IA→B can be predicted and provided.

In all the configurations of the method according to the invention as explained with respect to FIGS. 1 to 4, a simulated image IA→B of the second image recording type either is predicted or can be predicted. In both cases, the simulated image IA→B can be stored and used in a further method, as will be explained by way of example with respect to FIG. 5.

Figure 5:
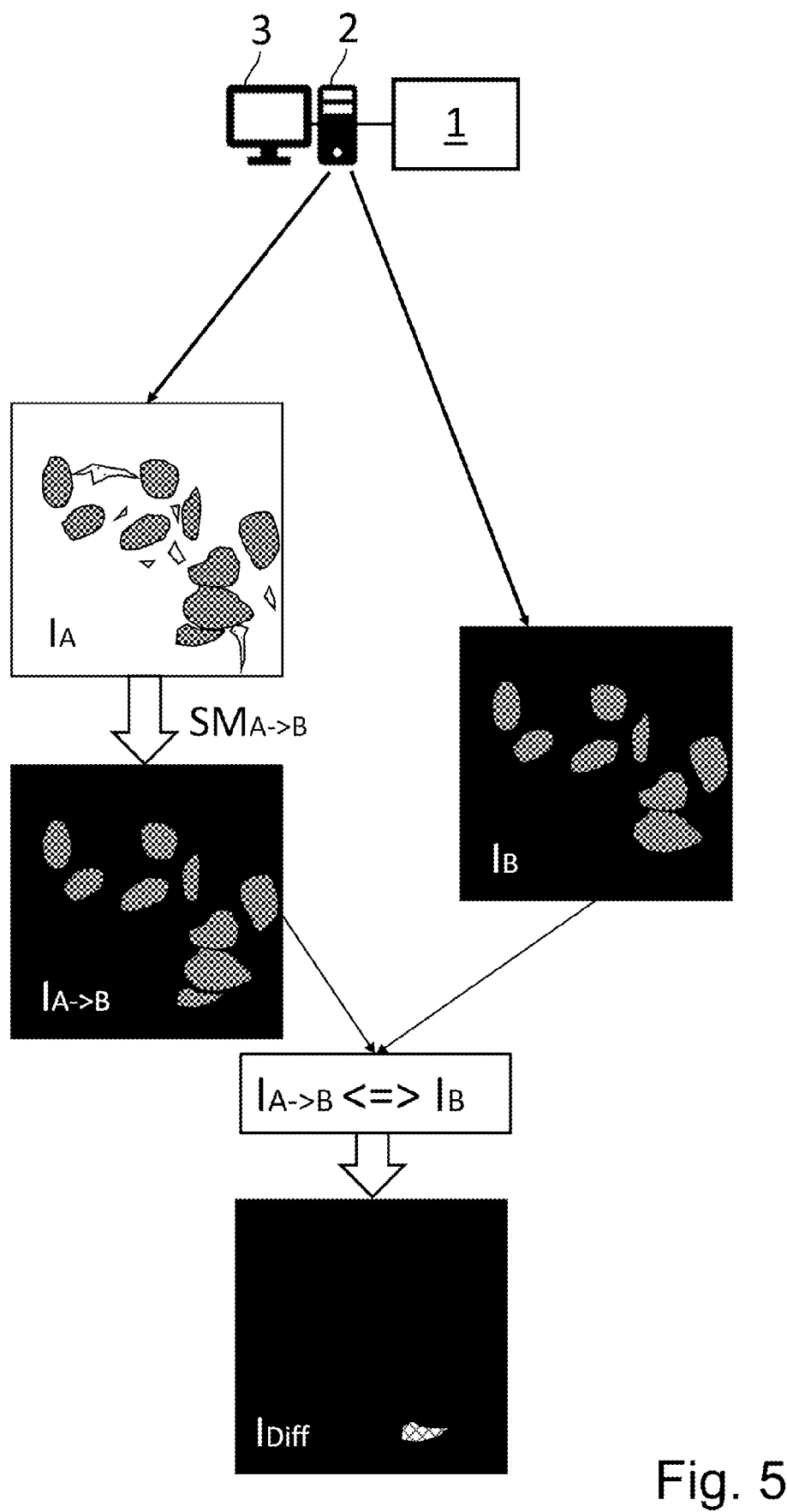
FIG. 5 shows a microscope and a schematic sequence of a section of the method according to the invention and also a use of a simulated second image.

FIG. 5 schematically illustrates such a possible use of the method according to the invention, wherein differences between images of different image recording types are determined and evaluated. The use of the simulated image IA→B of a second image recording type is emphasized here, which simulated image can be provided by means of the method according to the invention or is generated and provided while the method according to the invention is carried out (see above).

The microscope 1 captures a first image IA of a first image recording type, for example, in the bright field mode. By means of the correspondingly configured evaluation unit 2, proceeding from the first image IA, a simulated image IA→B is predicted, for example, as a fluorescence image, using a simulation model SMA→B. The data of the simulated image IA→B are stored. FIG. 5 indicates that the structures present in the first image IA with little dotting are no longer present in the simulated image IA→B.

Moreover, a second image IB of the sample in the second image recording type (e.g., fluorescence image) is actually captured and stored. Afterward, the simulated image IA→B and the second image IB are compared with one another, for example, by means of the correspondingly configured evaluation unit 2, in order to find differences between them. A difference image IDiff, for example, in which any differences found are visualized and optionally presented on the display 3, is generated on the basis of the comparison.

The difference illustrated by way of example in the difference image IDiff between the simulated image IA→B and the second image IB is a structure provided with a net-like hatching in the bottom right part of the difference image IDiff. This structure was predicted for the simulated image IA→B but actually cannot be confirmed in the second image IB.

The structure embodying the difference is not detectable with the second image recording type owing to inadequate sample preparation, for example. This could also involve a structure type (illustrated with dense dotting in image IA) of the sample which cannot be differentiated from other structure types (likewise illustrated with dense dotting in image IA) with the first image recording type. The difference can be categorized manually or—preferably—in an automated manner on the basis of available and retrievably stored prior information and/or on the basis of the characteristics of the image recording types.

The difference found can be handled further depending on its categorization. By way of example, the difference can be ignored in the further image evaluation, can influence the further evaluation in a weighted manner or can be explicitly selected and treated as a region of interest (ROI).

The invention claimed is:

1. A method for assessing simulation models used in microscopy, the method comprising:
in a first alternative,
   recording a first image ($I_A$) of a sample with a first image recording type;
   storing image values of the first image ($I_A$);
   predicting, based on a simulation model ($SM_{A \to B}$) being applied to the first image ($I_A$), a simulated image ($I_{A \to B}$) of a second image recording type of the sample;
   predicting, based on a simulation model ($SM_{(A \to B) \to C}$) being applied to the simulated image ($I_{A \to B}$) of the second image recording type of the sample, a simulated image ($I_{(A \to B) \to C}$) of a third image recording type of the sample;
   recording a third image ($I_C$) with the third image recording type;
   comparing the third image ($I_C$) with the simulated image ($I_{(A \to B) \to C}$) of the third image recording type for verification of compliance with previously defined quality criteria; and
   classifying the simulation models ($SM_{A \to B}$) and ($SM_{(A \to B) \to C}$) as permissible when the quality criteria are complied with;
or, in a second alternative,
   recording a first image ($I_A$) of a sample with a first image recording type;
   storing image values of the first image ($I_A$);
   predicting, based on a simulation model ($SM_{A \to C}$) being applied to the first image ($I_A$), a simulated image ($I_{A \to C}$) of a third image recording type of the sample;
   recording a third image ($I_C$) with the third image recording type;
   comparing the third image ($I_C$) with the simulated image $I_{(A \to C)}$ of the third image recording type for verification of compliance with previously defined quality criteria; and
   classifying the simulation model ($SM_{A \to C}$) as permissible when the quality criteria are complied with;
or in a third alternative,
   recording a first image ($I_A$) of a sample with a first image recording type;
storing image values of the first image ($I_A$);
predicting, based on a simulation model ($SM_{A \to B}$) being applied to the first image ($I_A$), a simulated image ($I_{A \to B}$) of a second image recording type of the sample, and predicting, based on a simulation model ($SM_{(A \to B) \to C}$) being applied to the simulated image ($I_{A \to B}$) of the second image recording type of the sample, a simulated image ($I_{(A \to B) \to C}$) of a third image recording type of the sample, or predicting, based on a simulation model ($SM_{A \to C}$) being applied to the first image ($I_A$), a simulated image ($I_{A \to C}$) of a third image recording type of the sample, and predicting, based on a simulation model ($SM_{(A \to C) \to A}$) being applied to the simulated image ($I_{A \to C}$) of the third image recording type, a simulated image ($I_{(A \to C) \to A}$) of the first image recording type;
comparing the first image ($I_A$) with the simulated image ($I_{(A \to B) \to A}$) or with the simulated image ($I_{(A \to C) \to A}$) for verification of compliance with previously defined quality criteria; and
classifying the simulation model ($SM_{A \to B}$) as permissible when the quality criteria are complied with.

2. The method of claim 1, wherein different contrast methods, different channels of a contrast method and/or different illumination powers of a contrast method are used as image recording types.

3. The method of claim 1, wherein the simulated images are predicted by means of a machine learning simulation model.

4. The method of claim 1, wherein image data of the images ($I_A$; $I_C$) in the first and/or third image recording type and/or image data of simulated images are kept as stored data and on request are retrieved and processed.

5. The method of claim 1, wherein the quality criteria include previously defined metrics and/or structure-based comparison values.

6. The method of claim 1, wherein the quality criteria are assessed by a trained machine learning simulation model.

7. The method of claim 1, wherein items of situation-dependent, sample-dependent and/or user-dependent context information are used as further input variables for the verification of the quality criteria.

8. The method as of claim 1, wherein a currently attained training state of a model for predicting the respective simulated image subjected to the verification for compliance with the quality criteria is determined depending on a result of the verification.

9. The method of claim 1, wherein the first image ($I_A$) and the third image ($I_C$) represent the same region of a sample and the image values are registered with respect to one another.

10. The method of claim 1, wherein the first, the second and/or the third alternative are/is implemented on the basis of a first image ($I_A$) of a first location of the sample, and the method further comprising:
predicting a simulated image ($I_{A \rightarrow B}$) based on a simulation model ($SM_{A \rightarrow B}$) being applied to a second image ($I'_A$) of a second location of the sample, the captured regions of the first image ($I_A$) of the first location and of the second image ($I'_A$) of the second location not overlapping.

11. The method of claim 1, further comprising providing an image predicted by means of a simulation model ($SM_{A \rightarrow B}$) classified as permissible or providing an image ($I_{A \rightarrow B}$) simulated by means of a simulation model ($SM_{A \rightarrow B}$), the prediction of which was classified as permissible.

12. The method of claim 11, further comprising:
recoding a second image ($I_B$) with the second image recording type;
storing the second image ($I_B$);
comparing the image ($I_{A \rightarrow B}$) with the stored second image ($I_B$); and
determining differences between the image ($I_{A \rightarrow B}$) and the stored second image ($I_B$).

* * * * *